United States Patent [19]

Taylor

[11] 3,968,472
[45] July 6, 1976

[54] VIBRATION DETECTION AND ANALYSIS SYSTEM EMPLOYING AN INTRINSIC SAFETY BARRIER

[75] Inventor: James K. Taylor, Columbus, Ohio

[73] Assignee: IRD Mechanalysis, Inc., Columbus, Ohio

[22] Filed: June 14, 1973

[21] Appl. No.: 369,993

Related U.S. Application Data

[62] Division of Ser. No. 145,420, May 20, 1971, abandoned.

[52] U.S. Cl. .................... 340/16 R; 307/318; 73/69; 317/18 C
[51] Int. Cl.² .................... G01S 3/80; H02H 1/02
[58] Field of Search ............ 181/.5 R, .5 NP; 340/16 R, 16 C, 16 M, 15.5 BH, 15.5 A; 73/67, 69; 317/18 C; 307/313, 318

[56] References Cited
UNITED STATES PATENTS

| | | | |
|---|---|---|---|
| 3,182,744 | 5/1965 | Vogel | 340/15.5 A |
| 3,365,617 | 1/1968 | Flanagan | 307/318 |
| 3,412,268 | 11/1968 | De Ford | 307/313 |
| 3,422,397 | 1/1969 | Lagoe | 340/16 C |
| 3,527,985 | 9/1970 | Brown | 317/16 |
| 3,734,233 | 5/1973 | Wiley | 340/15.5 BH |

OTHER PUBLICATIONS

W. I. Hickes, "Intrinsic Safety", *Chemical Engineering*, May 1, 1972, pp. 64–66.
Motorola– Zener/Rectifier Handbook, p. 91.

*Primary Examiner*—Maynard R. Wilbur
*Assistant Examiner*—N. Moskowitz
*Attorney, Agent, or Firm*—Harry B. Keck; George E. Manias

[57] ABSTRACT

An intrinsic safety barrier for use in combination with electromagnetic transducers which are intended to generate alternating current signals in hazardous zones and to transmit such alternating signals out of the hazardous zone to remote signal-responsive installations. The intrinsic safety barrier permits transmission of alternating current signals without significant distortion and yet precludes introduction of surges of electrical energy into the hazardous area.

6 Claims, 4 Drawing Figures

INVENTOR
JAMES K. TAYLOR
BY
Harry B. Keck

VIBRATION DETECTION AND ANALYSIS SYSTEM EMPLOYING AN INTRINSIC SAFETY BARRIER

This is a division of application Ser. No. 145,420, filed May 20, 1971, now abandoned.

BACKGROUND OF THE INVENTION

1. Field of the Invention

The invention relates to intrinsic safety barriers and more particularly to intrinsic safety barriers which are adapted to unidirectional transmission of alternating electrical signals without substantial distortion.

2. Description of the Prior Art

Intrinsic safety barriers have been available for many years. They were originally employed with signaling equipment in underground mines to enable the emission of intended electrical signals from the mine and to prevent introduction of electrical energy into the mine through the signaling system.

Recently the National Fire Protection Association has issued standards for intrinsically safe process control equipment, NFPA No. 493. The theory of intrinsic safety devices is that a minimum quantity of electrical energy is required to ignite or detonate explosive gases. When an electrical system is intrinsically safe, that minimum amount of electrical energy cannot be introduced into the system.

There are presently available intrinsic safety barriers which are suited to the protection of direct current systems. Such existing systems include a single Zener diode connected across the input terminals of the safety barrier circuit. The single Zener diode presents low electrical resistance in one direction and high electrical resistance in the opposite direction. If the applied voltage across a Zener diode is increased beyond a breakdown voltage level, the Zener diode exhibits low resistance in both directions. When an alternating electrical signal is applied to the input terminals of such prior art safety barrier circuits, the output signal becomes unsymmetrical, i.e., distorted, unless the amplitude of the input electrical signal is maintained at a relatively low value.

SUMMARY OF THE INVENTION

According to the present invention, an intrinsic safety barrier circuit is provided which employs a pair of similar Zener diodes having their common electrodes (cathodes or anodes) connected to each other and having their remaining electrodes (anodes or cathodes, respectively) connected across the input terminals of the circuit. One of the input terminals is connected to one of the output terminals through a resistor. The other one of the input terminals is connected to the other one of the output terminals through a common ground. This novel arrangement allows the circuit to transmit a substantially undistorted alternating current signal at amplitudes up to the breakdown voltage level of the two Zener diodes. At the same time, the circuit precludes the transmission of any substantial electrical energy from the output terminals to the input terminals. Preferably a current limiting fuse is provided in series with the resistor between the one input terminal and the one output terminal.

The present intrinsic safety barrier circuit is particularly adapted to use in combination with electromagnetic vibration transducers and vibration analysis apparatus.

DESCRIPTION OF THE PREFERRED EMBODIMENT(S)

Figure 1:
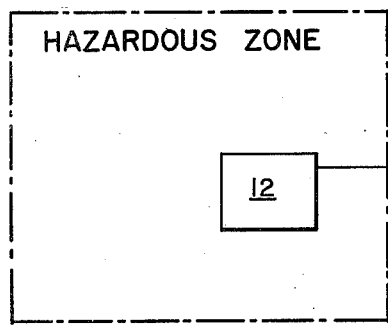
FIG. 1 is a schematic illustration of a typical installation employing the intrinsic safety barrier device of this invention.

In FIG. 1 there is illustrated a hazardous zone 10 defined by a dash-dot boundary line. A typical hazardous area might be a pumping station for flammable liquids or gases; a petrochemical processing apparatus; any other environment where the manifestation of uncontrolled electrical energy might be undesirable. Within the hazardous zone 10 an electromechanical transducer 12 adapted to generate an alternating current electrical signal through a cable 13, an intrinsic safety barrier device 14, and a cable 15 to a signal responsive device 16 which is located outside the hazardous zone 10. It will be observed that the intrinsic safety barrier device 14 is disposed outside the hazardous zone 10. The transducer 12 can deliver an alternating current signal directly through the cable 13, device 14 and cable 15 to the signal responsive device 16 without substantial distortion; yet the signal responsive device 16 is prevented for delivering any substantial electrical energy beyond the intrinsic safety barrier device 14.

Figure 2:
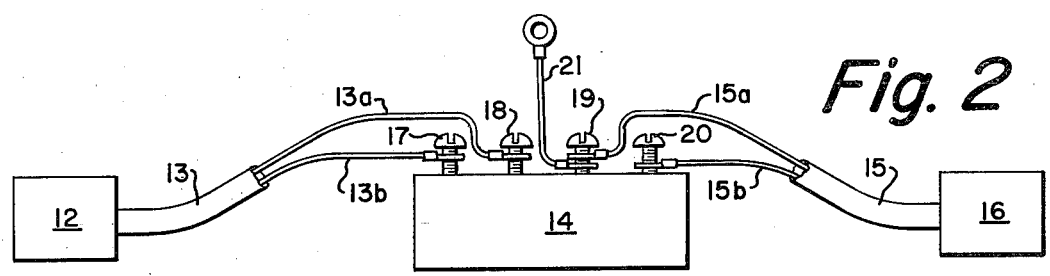
FIG. 2 is an illustration, partly schematic, showing the present intrinsic safety barrier device.

Referring to FIG. 2, it will be seen that the intrinsic safety barrier device 14 has a pair of input terminals 17, 18 and a pair of output terminals 19, 20. Two conductors 13a, 13b of the cable 13 are connected to the input terminals 17, 18 respectively. Two conductors 15a, 15b of the cable 15 are connected to the output terminals 19, 20 respectively. A grounding conductor 21 is connected to the output terminal 19.

The transducer 12 may be, for example, an acoustical tranducer, a photo-transducer, a seimic transducer of the type described in U.S. Pat. No. 3,157,852 or a device which generates an alternating analog electrical signal. The signal responsive device 16 may be a monitor as described in U.S. Pat. No. 3,201,776 or an oscilloscope or a vibration analysis device of the type described in U.S. Pat. No. 3,501,965, or any device which accepts an alternating analog electrical signal as an input signal.

The system of FIG. 2 is especially adapted for use in remote vibration measurements in hazardous zones. The electro-mechanical transducer 12 is a vibration transducer adapted to generate alternating current signals in response to mechanical vibrations. The signal responsive means 16 is adapted to provide some useful visible or mechanical phenomena in response to the signal, e.g., to provide a meter indication, a written record, and audible and/or visible alarm indication, or perhaps to initiate a machine-shut down.

Figure 3:
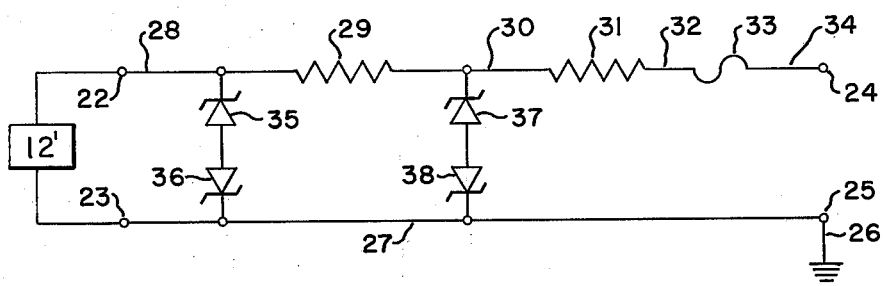
FIG. 3 is a schematic illustration of a preferred embodiment of the present intrinsic safety barrier circuit.

Referring to FIG. 3, a preferred circuit for the intrinsic safety barrier device 14 is illustrated including a pair of input terminals 22, 23, a pair of output terminals 24, 25, a grounding conductor 26, an internal ground conductor 27. An alternating current signal generating device 12' is connected across the input terminals 22, 23. Between the input terminal 22 and the output terminal 24 there is in series a conductor 28, a resistor 29, a conductor 30, a resistor 31, a conductor 32, a current limiting fuse 33 and a conductor 34.

Joining the conductor 28 and the conductor 27 is a pair of similar Zener diodes 35, 36 having their cathodes connected to each other and having their anodes communicating directly with the input terminals 22, 23. Communicating with the conductor 30 and the conductor 27 is a second pair of similar Zener diodes 37, 38 having their cathodes connected to each other and having their anodes connected between the conductor 30 and the conductor 27.

Preferably the similar Zener diodes 35, 36 have nearly identical properties, i.e., the same breakdown voltage characteristics. Likewise the similar Zener diodes 37, 38 will have nearly identical properties, i.e., the same voltage breakdown characteristics. The diodes 35, 36 have a breakdown voltage of about 5.6 volts in one preferred embodiment whereas the diodes 37, 38 have a breakdown voltage of about 6.2 volts. The resistors 29, 31 have values of about 220 ohms. The fuse 33 in the preferred embodiment allows current flow up to about one-sixteenth ampere.

Figure 4:
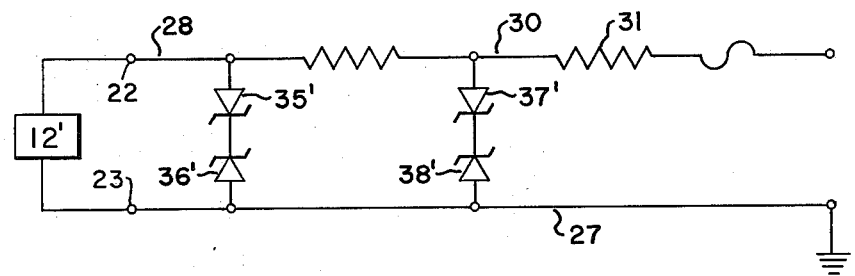
FIG. 4 is a schematic illustration similar to FIG. 3 showing an alternative embodiment of this invention.

An alternative embodiment is shown in FIG. 4 wherein all of the elements of FIG. 3 are provided except that the Zener diodes 35', 36' and 37', 38' are reversed, i.e., the anodes of the Zener diodes 35', 36' and 37', 38' are joined together and the cathodes communicate with the conductors 28, 27 and 30, 27 respectively.

By employing the circuitry of FIGS. 3 and 4 as an intrinsic safety barrier device, typical seismic velocity pickups can be employed at vibration levels in excess of 3 inches per second peak, without experiencing unsymmetrical distortion of the alternating current signal. At vibration levels above 3 inches per second, the resulting alternating current signal experiences symmetrical clipping. This is to be contrasted with the unsymmetrical clipping which occurs in the same system employing prior art intrinsic safety barrier devices at vibration levels in excess of 0.5 inches per second peak.

ALTERNATIVE EMBODIMENT

It will be observed from FIGS. 3 and 4 that it is possible to delete from the circuitry the resistor 31 and the two Zener diodes 37, 38 (FIG. 3) and 37', 38' (FIG. 4) with the result that the circuit would then include conductor 28, resistor 29, conductor 30, conductor 32, fuse 33, conductor 34. Zener diodes 35, 36 (FIG. 3) and 35', 36' (FIG. 4) and ground conductor 27. In this minimal condition, the present circuitry is adequate to perform its intended function. However by providing the double Zener diodes 35, 36 and 37, 38 in pairs, a fail-safe design is achieved wherein the flow of electrical energy from the output terminals 24, 25 through the input terminals 22, 23 is precluded even if one of the pairs 35, 36 or 37, 38 should be defective, i.e., open circuit.

By employing the present intrinsic safety barrier device, the expenses of remote installations in hazardous areas are greatly reduced. The transducer pickup cable does not require enclosure in conduit. The transducer itself does not require an explosion proof enclosure; hence a small lightweight package is achieved. Carelessness of an operator cannot defeat the design safety, i.e., there is no need for an explosion-resistant cover which might neglect to replace following inspection or maintenance. In the absence of explosion-resistant housings, it is possible to replace or to test the transducer while the system within the hazardous area is fully operating.

TESTS

An intrinsic safety barrier device as shown in FIG. 3 was tested by applying a test voltage of 234 r.m.s. volts across the output terminals 24, 25. The voltage developed at the input terminals peaked at 8 volts for a duration of 4.5 milliseconds. Electrical energy at this level is considered inadequate to ignite the most easily ignitable mixture of air and certain explosive gases or vapors; hence the tested barrier device is considered to be within the intrinsic safety range.

I claim:

1. A vibration analysis system adapted for use in remote vibration measurements in combustible hazardous zones comprising:
   an electromechanical vibration transducer mounted within the said hazardous zone and adapted to generate alternating current signals in response to mechanical vibrations;
   signal responsive means mounted in a non-hazardous zone which is remote from said hazardous zone and adapted to convert an alternating alert signal into visible or mechanical phenomena;
   conductor means joining the said transducer and the said signal responsive means, said conductor means passing from the said hazardous zone to the said non-hazardous zone;
   an intrinsic safety barrier device comprising more than one semiconductor interposed in the said conductor means to permit substantially undistorted signal transmission from the said transducer means to the said signal responsive means and further adapted to prevent transmission of substantial electrical energy from the said signal responsive means into the said hazardous zone.

2. The vibration analysis system of claim 1 wherein the intrinsic safety barrier device comprises:
   a circuit having two input terminals and having two output terminals;
   the said input terminals being connected to the said transducers and the said output terminals being connected to the said signal responsive means;
   a resistor joining one input terminal with one output terminal; the other input terminal and the other output terminal being joined to a common ground;
   a pair of similar Zener diodes having their common electrodes connected to each other and having their remaining electrodes connected across the said input terminals.

3. The vibration analysis system of claim 2 wherein the said pair of similar Zener diodes have their cathodes connected to each other and have their anodes connected across the said input terminals.

4. The vibration analysis system of claim 2 wherein the said pair of similar Zener diodes have their anodes connected to each other and have their cathodes connected across the said input terminals.

5. The vibration analysis system of claim 3 wherein the said resistor consists of two separate resistors having a common center connection and wherein the said circuit includes:
   a second pair of similar Zener diodes having their cathodes connected to each other and having their anodes connected between the said center connection and the said common ground.

6. The vibration analysis system of claim 4 wherein said resistor consists of two separate resistors having a common center connection and wherein the said circuit includes:

a second pair of similar Zener diodes having their anodes connected to each other and having their cathodes connected between the said center connection and the said common ground.

* * * * *